US010997457B2

(12) United States Patent
Rhemann et al.

(10) Patent No.: US 10,997,457 B2
(45) Date of Patent: May 4, 2021

(54) METHODS, SYSTEMS, AND MEDIA FOR RELIGHTING IMAGES USING PREDICTED DEEP REFLECTANCE FIELDS

(71) Applicant: Google LLC, Mountain View, CA (US)

(72) Inventors: Christoph Rhemann, Marina Del Rey, CA (US); Abhimitra Meka, Saarbrücken (DE); Matthew Whalen, San Clemente, CA (US); Jessica Lynn Busch, Long Beach, CA (US); Sofien Bouaziz, Los Gatos, CA (US); Geoffrey Douglas Harvey, Culver City, CA (US); Andrea Tagliasacchi, Toronto (CA); Jonathan Taylor, San Francisco, CA (US); Paul Debevec, Culver City, CA (US); Peter Joseph Denny, Venice, CA (US); Sean Ryan Francesco Fanello, San Francisco, CA (US); Graham Fyffe, Los Angeles, CA (US); Jason Angelo Dourgarian, Los Angeles, CA (US); Xueming Yu, Arcadia, CA (US); Adarsh Prakash Murthy Kowdle, San Francisco, CA (US); Julien Pascal Christophe Valentin, Oberageri (CH); Peter Christopher Lincoln, South San Francisco, CA (US); Rohit Kumar Pandey, Mountain View, CA (US); Christian Häne, Berkeley, CA (US); Shahram Izadi, Tiburon, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/616,235

(22) PCT Filed: Oct. 16, 2019

(86) PCT No.: PCT/US2019/056532
§ 371 (c)(1),
(2) Date: Nov. 22, 2019

(87) PCT Pub. No.: WO2020/236206
PCT Pub. Date: Nov. 26, 2020

(65) Prior Publication Data
US 2020/0372284 A1 Nov. 26, 2020

Related U.S. Application Data

(60) Provisional application No. 62/852,274, filed on May 23, 2019.

(51) Int. Cl.
G06K 9/46 (2006.01)
G06T 15/50 (2011.01)
(Continued)

(52) U.S. Cl.
CPC ......... G06K 9/4661 (2013.01); G06K 9/6256 (2013.01); G06N 3/08 (2013.01); G06T 15/20 (2013.01); G06T 15/506 (2013.01)

(58) Field of Classification Search
CPC ..... G06T 15/20; G06T 15/506; G06K 9/1661; G06K 9/6256; G06N 3/08
See application file for complete search history.

(56) References Cited

U.S. PATENT DOCUMENTS 8,194,072 B2   6/2012  Jones et al.
10,692,276 B2* 6/2020  Sunkavalli ............. G06T 19/20

OTHER PUBLICATIONS

Anderson, R. et al., "Jump: Virtual Reality Video", in ACM Transactions on Graphics, vol. 35, No. 6, Nov. 2016, pp. 1-13.
(Continued)

Primary Examiner — Ke Xiao
Assistant Examiner — Jed-Justin Imperial
(74) Attorney, Agent, or Firm — Brake Hughes Bellermann LLP

(57) ABSTRACT

Methods, systems, and media for relighting images using predicted deep reflectance fields are provided. In some
(Continued)

embodiments, the method comprises: identifying a group of training samples, wherein each training sample includes (i) a group of one-light-at-a-time (OLAT) images that have each been captured when one light of a plurality of lights arranged on a lighting structure has been activated, (ii) a group of spherical color gradient images that have each been captured when the plurality of lights arranged on the lighting structure have been activated to each emit a particular color, and (iii) a lighting direction, wherein each image in the group of OLAT images and each of the spherical color gradient images are an image of a subject, and wherein the lighting direction indicates a relative orientation of a light to the subject; training a convolutional neural network using the group of training samples, wherein training the convolutional neural network comprises: for each training iteration in a series of training iterations and for each training sample in the group of training samples: generating an output predicted image, wherein the output predicted image is a representation of the subject associated with the training sample with lighting from the lighting direction associated with the training sample; identifying a ground-truth OLAT image included in the group of OLAT images for the training sample that corresponds to the lighting direction for the training sample; calculating a loss that indicates a perceptual difference between the output predicted image and the identified ground-truth OLAT image; and updating parameters of the convolutional neural network based on the calculated loss; identifying a test sample that includes a second group of spherical color gradient images and a second lighting direction; and generating a relit image of the subject included in each of the second group of spherical color gradient images with lighting from the second lighting direction using the trained convolutional neural network.

23 Claims, 6 Drawing Sheets

(51) Int. Cl.
*G06T 15/20* (2011.01)
*G06N 3/08* (2006.01)
*G06K 9/62* (2006.01)

(56) References Cited

OTHER PUBLICATIONS

Barron, J.T. and Malik, J., "Shape, Illumination and Reflectance from Shading", in IEEE Transactions on Pattern Analysis and Machine Intelligence, vol. 37, No. 8, Dec. 2014, pp. 1-8.
Berard, P. et al., "Lightweight Eye Capture Using a Parametric Model", in AMC Transactions on Graphics, vol. 35, No. 4, Jul. 2016, pp. 1-12.
Bermano, A. et al., "Detailed Spatio-Temporal Reconstruction of Eyelids", in ACM Transactios on Graphics, vol. 34, No. 4, Aug. 2015, pp. 1-11.
Blanz, V. and Vetter, T., "A Morphable Model for the Synthesis of 3D Faces", in Proceedings of the Conference on Computer Graphics and Interactive Techniques, Los Angeles, CA, USA, Aug. 8-13, 1999, pp. 187-194.
Chen, Q and Koltun, V., "Photographic Image Synthesis with Cascaded Refinement Networks", in Proceedings of the International Conference on Computer Vision, Venice, Italy, Oct. 22-29, 2017 pp. 1511-1520.
Debevec, P. et al., "Acquiring the Reflectance Field of a Human Face", in Proceedings of International Conference on Computer Graphics and Interactive Techniques, New Orleans, Louisiana, USA, Jul. 23-28, 2000, pp. 145-156.
Debevec, P., "The Light Stages and Their Applications to Photoreal Digital Actors", in Proceedings of Conference and Exhibition on Computer Graphics and Interactive Techniques in Asia, Singapore, Nov. 28-Dec. 1, 2012, pp. 1-4.
Einarsson, P. et al., "Relighting Human Locomotion with Flowed Reflectance Fields", in Proceedings of the 17th Eurographics Conference on Rendering Techniques, Aire-la-Ville, Switzerland, Jun. 26-28, 2006, pp. 1-12.
Eslami, S.M.A. et al., "Neural Scene Representation and Rendering", in Science, vol. 360, No. 6394, Jun. 2018, pp. 1204-1210.
Fyffe, G and Debevec, P., "Cosine Lobe Based Relighting from Gradient Illumination Photographs", in Journal of Virtual Reality and Broadcasting, vol. 9, No. 2, Feb. 2012, pp. 1-11.
Fyffe, G. and Debevec, P., "Single-Shot Reflectance Measurement from Polarized Color Gradient Illumination", in Proceedings of International Conference on Computational Photography, Houston, TX, USA, Apr. 24-26, 2015, pp. 1-10.
Garrido, P. et al., "Reconstructing Detailed Dynamic Face Geometry from Monocular Video", in ACM Transactions of Graphics, vol. 32, No. 6, Nov. 2013, pp. 1-10.
Garrido, P. et al., "Reconstruction of Personalized 3D Face Rigs from Monocular Video", in ACM Transactions of Graphics, vol. 35, No. 3, Jun. 2016, pp. 1-15.
Ghosh, A. et al., "Multiview Face Capture Using Polarized Spherical Gradient Illumination", in ACM Transactions on Graphics, vol. 30, No. 6, Dec. 2011.
Gotardo, P. et al., "Practical Dynamic Facial Appearance Modeling and Acquisition", in ACM Transactions on Graphics, vol. 37, No. 6, Nov. 2018, pp. 1-13.
Hawkins, T. et al., "Animatable Facial Reflectance Fields", in Proceedings of the 15th Eurographics Conference on Rendering Techniques, Norrköping, Sweden, Jun. 21-23, 2004, pp. 1-12.
Hu, L. et al., "Single-View Hair Modeling Using a Hairstyle Database", in ACM Transactions on Graphics, vol. 34, No. 4, Aug. 2015, pp. 1-9.
Ichim, A. E. et al., "Dynamic 3D Avatar Creation from Hand-Held Video Input", in ACM Transactions on Graphics, vol. 34, No. 4, Aug. 2015, pp. 1-14.
Isola, P. et al., "Image-to-Image Translation with Conditional Adversarial Netowrks", in Proceedings of the Conference on Computer Vision and Pattern Recognition, Honolulu, Hawaii, USA, Jul. 22-25, 2017, pp. 1125-1334.
Kanamori, Y. and Endo, Y., "Relighting Humans: Occlusion-Aware Inverse Rendering for Full-Body Human Images" in ACM Transactions on Graphics, vol. 37, No. 6, Nov. 2018, pp. 1-11.
Kingma, D. and Ba, J., "Adam: A Method for Stochastic Optimization", in Proceedings of International Conference on Learning Representations, San Diego, CA, USA, May 7-9, 2015, pp. 1-15.
Kuo, W. et al., "PatchFCN for Intracranial Hemorrhage", in Computer Vision and Pattern Recognition, Apr. 2019, pp. 1-9.
Li, G. et al., "Capturing Relightable Human Performances under General Uncontrolled Illumination" in Computer Graphics Forum, vol. 32, No. 2, May 2013, pp. 1-10.
Li, Z et al., "Materials for Masses: SVBRDF Acquisition with a Single Mobile Phone Image", in Proceedings of the European Coference on Computer Vision, Munich, Germany, Sep. 8-14, 2018, pp. 72-87.
Li, Z. et al., "Learning to Reconstruct Shape and Spatially-Varying Reflectance from a Single Image", in ACM Transactions on Graphics, vol. 37, No. 6, Nov. 2018.
Lombardi, S. et al., "Deep Appearance Models for Face Rendering", in ACM Transactions on Graphics, vol. 37, No. 4, Aug. 2018, pp. 1-13.
Long, J. et al., "Fully Convolutional Networks for Semantic Segmentation", in Proceedings of IEEE Conference on Computer Visiona and Pattern Recognition, Boston, Massachusetts, USA, Jun. 7-12, 2015, pp. 3431-3440.
Ma, W. et al., "Rapid Acquisition of Specular and Diffuse Normal Maps from Polarized Spherical Gradient Illumination", in Proceedings of the 18th Eurographics Conference on Rendering Techniques, Grenoble, France, Jun. 25-27, 2007, pp. 183-194.

(56) References Cited

OTHER PUBLICATIONS

Martin-Brualla, R. et al., "LookinGood: Enhancing Performance Capture with Real-Time Neural Re-Rendering", in ACM Transactions on Graphics, vol. 37, No. 6, Nov. 2018, pp. 1-14.
Meka, A. et al., "LIME: Live Intrinsic Material Estimation", in Proceedings of IEEE Conference on Computer Vision and Pattern Recognition, Salt Lake City, UT, USA, Jun. 18-22, 2018, pp. 6315-6324.
Meka, A. et al., "Live User-Guided Intrinsic Video for Static Scenes", in IEEE Transactions on Visualization and Computer Graphics, vol. 23, No. 11, Nov. 2017, pp. 2447-2454.
Nalbach, O., et al., "Deep Shading: Convolution Neural Networks for Screen-Space Shading", in Computer Graphics Forum, vol. 36, No. 4, Jul. 2017, pp. 65-78.
Nam et al., "Practical SVBRDF Acquisition of 3D Objects with Unstructured Flash Photography", in Transactions on Graphics, vol. 37, vo. 6, Nov. 2018.
Peers, P. et al., "Post-Production Facial Performance Relighting Using Reflectance Transfer", in Proceedings of ACM SIGGRAPH, San Diego, CA, USA, Aug. 5-9, 2007, pp. 1-10.
Ren, P. et al, "Image Based Relighting Using Neural Networks", in ACM Transactions on Graphics, vol. 34, No. 4, Aug. 2015, pp. 1-13.
Ronneberger, O. et al, "U-Net:Convolutional Networks for Biomedical Image Segmentation", in Proceedings on Medical Image Computing and Computer-Assisted Intervention, Munchen, Germany, May 18, 2015, pp. 1-8.
Saito, S. et al., "Photorealistic Facial Texture Inference Using Deep Neural Networks", in Proceedings with IEEE Conference on Computer Vision Pattern Recognition, Honolulu, Hawaii, USA, Jul. 21-26, 2017, pp. 5144-5153.
Shih, Y. et al., "Style Transfer to Headshot Portraits", in ACM Transactions on Graphics, vol. 33, No. 4, Jul. 2014, pp. 1-14.
Shu, Z. et al., "Portrait Lighting Transfer Using a Mass Transport Approach", in ACM Transactions on Graphics, vol. 37, No. 1, Oct. 2017, pp. 1-15.
Simonyan, K. and Zisserman, A., "Very Deep Convolutional Networks for Large Scale Image Recognition", Apr. 2015, pp. 1-14.
Theobalt, C. et al., "Seeing People in Different Light-Joint Shape, Motion, and Reflectance Capture", in IEEE Transactions on Visualization and Computer Graphics, vol. 13, No. 4, Aug. 2007, pp. 1-13.
Thies, J. et al., "Face2Face: Real-Time Face Capture and Reenactment of RBG Videos", in Proceedings of the IEEE Conference on Computer Vision and Pattern Recognition, Las Vegas, NV, USA, Jun. 26-Jul. 1, 2016, pp. 2387-2395.
Wen, Z. et al., "Face Relighting with Radiance Environment Maps", in Proceedings of Computer Society Conference on Computer Vision and Pattern Recognition, Madison, WI, USA, Jun. 18-20, 2003, pp. 1-12.
Wenger, A. et al., "Performance Relighting and Reflectance Transformation with Time-Multiplexed Illumination", in Proceedings of SIGGRAPH, Los Angeles, CA, USA, Jul. 31-Aug. 2, 2015, pp. 1-9.
Xu, Z. et al., "Deep Image-Based Relighting from Optimal Sparse Samples", in ACM Transactions on Graphics, vol. 37, No. 4, Aug. 2018, pp. 1-13.
Yamaguchi, S. et al., "High-Fidelity Facial Reflectance and Geometry Inference from an Unconstrained Image", in ACM Transactions on Graphics, vol. 37, No. 2, Aug. 2018.
Zhang, M. et al., "A Data-Driven Approach to Four-View Image-Based Hair Modeling", in ACM Transactions on Graphics, vol. 36, No. 4, Jul. 2017, pp. 1-11.
Zhang, R. et al., "The Unreasonable Effectiveness of Deep Features as a Perceptual Metric", in Proceedings of the Conference on Computer Vision and Pattern Recognition, Salt Lake City, UT, USA, Jun. 18-22, 2018, pp. 586-595.
Zhu, J. et al., "Unpaired Image-to-Image Translation Using Cycle-Consistent Adversarial Networks", in Proceedings of International Conference on Computer Vision, Venice, Italy, Oct. 22-29, 2017, pp. 2223-2232.
Chabert, C. et al., "Relighting Human Locomotion with Flowed Reflectance Fields", in Conference on Computer Graphics and Interactive Techniques, Boston, MA, Jul. 30, 2006, p. 1.
International Search Report and Written Opinion dated Mar. 17, 2020 in International Patent Application No. PCT/US2019/056532.
Kampouris et al., "Diffuse-Specular Separation Using Binary Spherical Gradient Illumination", in Proceedings of Eurographics Conference on Rendering Techniques, Delft, NE, Apr. 16-20, 2018, pp. 1-10.
Meka, A. et al., "Deep Reflectance Fields", in ACM Transactions on Graphics, vol. 38, No. 4, Jul. 12, 2019, pp. 1-12.
Sun et al., "Single Image Portrait Relighting", in ACM Transactions on Graphics, vol. 38, No. 4, Jul. 12, 2019, pp. 1-12.

\* cited by examiner

US 10,997,457 B2

METHODS, SYSTEMS, AND MEDIA FOR RELIGHTING IMAGES USING PREDICTED DEEP REFLECTANCE FIELDS

CROSS-REFERENCE TO RELATED PATENT APPLICATION

This application claims the benefit of U.S. Provisional Patent Application No. 62/852,274, filed May 23, 2019, which is hereby incorporated by reference herein in its entirety.

TECHNICAL FIELD

The disclosed subject matter relates to methods, systems, and media for relighting images using predicted deep reflectance fields.

BACKGROUND

Photo-realistic relighting of human faces is a highly sought after feature with many applications ranging from visual effects to truly immersive virtual experiences. That said, human users are often capable of distinguishing real faces from synthetic renderings. Thus, photo-realistically relighting any human face is indeed a challenge with many difficulties including modelling sub-surface scattering and blood flow to estimating the interaction between light and individual strands of hair, and as a result is laborious and computationally intensive. Further, many current methods require a large set of input images, and so are unsuitable for use with moving or dynamic subjects.

Accordingly, it is desirable to provide new methods, systems, and media for relighting images using predicted deep reflectance fields.

SUMMARY

Methods, systems, and media for relighting images using predicted deep reflectance fields are provided.

In accordance with a first aspect of the disclosed subject matter, a method for relighting images using deep reflectance fields is provided, the method comprising: identifying a group of training samples, wherein each training sample includes (i) a group of one-light-at-a-time (OLAT) images that have each been captured when one light of a plurality of lights arranged on a lighting structure has been activated, (ii) a group of spherical color gradient images that have each been captured when the plurality of lights arranged on the lighting structure have been activated to each emit a particular color, and (iii) a lighting direction, wherein each image in the group of OLAT images and each of the spherical color gradient images are an image of a subject, and wherein the lighting direction indicates a relative orientation of a light to the subject; training a convolutional neural network using the group of training samples; identifying a test sample that includes a second group of spherical color gradient images and a second lighting direction; and generating a relit image of the subject included in each of the second group of spherical color gradient images with lighting from the second lighting direction using the trained convolutional neural network. In some embodiments, training the convolutional neural network comprises, for each training iteration in a series of training iterations and for each training sample in the group of training samples: generating an output predicted image, wherein the output predicted image is a representation of the subject associated with the training sample with lighting from the lighting direction associated with the training sample; identifying a ground-truth OLAT image included in the group of OLAT images for the training sample that corresponds to the lighting direction for the training sample; calculating a loss that indicates a perceptual difference between the output predicted image and the identified ground-truth OLAT image; and updating parameters of the convolutional neural network based on the calculated loss.

In accordance with a second aspect of the disclosed subject matter, a method for training a convolutional neural network for relighting images using deep reflectance fields is provided, the method comprising: identifying a group of training samples, wherein each training sample includes (i) a group of one-light-at-a-time (OLAT) images that have each been captured when one light of a plurality of lights arranged on a lighting structure has been activated, (ii) a group of spherical color gradient images that have each been captured when the plurality of lights arranged on the lighting structure have been activated to each emit a particular color, and (iii) a lighting direction, wherein each image in the group of OLAT images and each of the spherical color gradient images are an image of a subject, and wherein the lighting direction indicates a relative orientation of a light to the subject; and training a convolutional neural network using the group of training samples. Training the convolutional neural network comprises, for each training iteration in a series of training iterations and for each training sample in the group of training samples: generating an output predicted image, wherein the output predicted image is a representation of the subject associated with the training sample with lighting from the lighting direction associated with the training sample; identifying a ground-truth OLAT image included in the group of OLAT images for the training sample that corresponds to the lighting direction for the training sample; calculating a loss that indicates a perceptual difference between the output predicted image and the identified ground-truth OLAT image; and updating parameters of the convolutional neural network based on the calculated loss.

In accordance with a third aspect of the disclosed subject matter a method for relighting images using deep reflectance fields is provided, the method comprising: identifying a test sample that includes at least first and second spherical color gradient images of a subject and a first lighting direction; and generating a relit image of the subject included in each of the spherical color gradient images with lighting from the first lighting direction by using a trained convolutional neural network. In some embodiments the convolutional neural network was trained by: identifying a group of training samples, wherein each training sample includes (i) a group of one-light-at-a-time (OLAT) images that have each been captured when one light of a plurality of lights arranged on a lighting structure has been activated, (ii) a group of spherical color gradient images that have each been captured when the plurality of lights arranged on the lighting structure have been activated to each emit a particular color, and (iii) a lighting direction, wherein each image in the group of OLAT images and each of the spherical color gradient images are an image of a subject, and wherein the lighting direction indicates a relative orientation of a light to the subject; and training the convolutional neural network using the group of training samples, wherein training the convolutional neural network comprises: for each training iteration in a series of training iterations and for each training sample in the group of training samples: generating an output predicted image, wherein the output predicted image is a representation of the subject associated with the training sample with lighting from the lighting direction associated with the training sample; identifying a ground-truth OLAT image included in the group of OLAT images for the training sample that corresponds to the lighting direction for the training sample; calculating a loss that indicates a perceptual difference between the output predicted image and the identified ground-truth OLAT image; and updating parameters of the convolutional neural network based on the calculated loss.

In the first, second or third aspect, in some embodiments, the lighting structure is a spherical dome and the plurality of lights are arranged on a surface of the spherical dome.

In the first, second or third aspect, in some embodiments, the loss is calculated using a pre-trained neural network.

In the first, second or third aspect, in some embodiments, the loss includes a first loss component that indicates the perceptual difference between the output image and the identified OLAT image based on low-frequency information in each image, and the loss includes a second loss component that indicates the perceptual difference between the output image and the identified OLAT image based on high-frequency information in each image. In some embodiments, the second loss component is calculated using a trained neural network that has been trained to take, as an input, an OLAT image, and to generate, as an output, a light direction of a light used to generate the OLAT image.

In the first, second or third aspect, in some embodiments, the group of OLAT images and the group of spherical color gradient images for each of the training samples are captured from a first plurality of cameras, each having a viewpoint from a first plurality of viewpoints, and the second group of spherical color gradient images corresponding to the test sample are captured from a camera having a viewpoint that is not included in the first plurality of viewpoints.

In the first, second or third aspect, in some embodiments, the method further comprises generating an aligned ground-truth OLAT image prior to calculating the loss, wherein the loss is calculated using the aligned ground-truth image.

In the first, second or third aspect, in some embodiments the first spherical color gradient image of the subject has a light color with an RGB value of: $((1+\theta_x)/2, (1+\theta_y)/2, (1+\theta_z)/2)$, and the second spherical color gradient image has a light color with an RGB value of: $((1-\theta_x)/2, (1-\theta_y)/2, (1-\theta_z)/2)$, where $\theta$ is a direction vector of the light.

In accordance with some embodiments of the disclosed subject matter, a system for relighting images using deep reflectance fields is provided, the system comprising a memory and a hardware processor that, when executing computer executable instructions stored in the memory, is configured to: identify a group of training samples, wherein each training sample includes (i) a group of one-light-at-a-time (OLAT) images that have each been captured when one light of a plurality of lights arranged on a lighting structure has been activated, (ii) a group of spherical color gradient images that have each been captured when the plurality of lights arranged on the lighting structure have been activated to each emit a particular color, and (iii) a lighting direction, wherein each image in the group of OLAT images and each of the spherical color gradient images are an image of a subject, and wherein the lighting direction indicates a relative orientation of a light to the subject; train a convolutional neural network using the group of training samples; identify a test sample that includes a second group of spherical color gradient images and a second lighting direction; and generate a relit image of the subject included in each of the second group of spherical color gradient images with lighting from the second lighting direction using the trained convolutional neural network. In some embodiments, training the convolutional neural network comprises, for each training iteration in a series of training iterations and for each training sample in the group of training samples: generating an output predicted image, wherein the output predicted image is a representation of the subject associated with the training sample with lighting from the lighting direction associated with the training sample; identifying a ground-truth OLAT image included in the group of OLAT images for the training sample that corresponds to the lighting direction for the training sample; calculating a loss that indicates a perceptual difference between the output predicted image and the identified ground-truth OLAT image; and updating parameters of the convolutional neural network based on the calculated loss.

In accordance with some embodiments of the disclosed subject matter, a system is provided, the system comprising a memory and a hardware processor that, when executing computer executable instructions stored in the memory, is configured to perform a method according to any aspect or embodiment described herein.

In accordance with some embodiments of the disclosed subject matter, a non-transitory computer-readable medium containing computer executable instructions that, when executed by a processor, cause the processor to perform a method for relighting images using deep reflectance fields is provided, the method comprising: identifying a group of training samples, wherein each training sample includes (i) a group of one-light-at-a-time (OLAT) images that have each been captured when one light of a plurality of lights arranged on a lighting structure has been activated, (ii) a group of spherical color gradient images that have each been captured when the plurality of lights arranged on the lighting structure have been activated to each emit a particular color, and (iii) a lighting direction, wherein each image in the group of OLAT images and each of the spherical color gradient images are an image of a subject, and wherein the lighting direction indicates a relative orientation of a light to the subject; training a convolutional neural network using the group of training samples; identifying a test sample that includes a second group of spherical color gradient images and a second lighting direction; and generating a relit image of the subject included in each of the second group of spherical color gradient images with lighting from the second lighting direction using the trained convolutional neural network. In some embodiments, training the convolutional neural network comprises, for each training iteration in a series of training iterations and for each training sample in the group of training samples: generating an output predicted image, wherein the output predicted image is a representation of the subject associated with the training sample with lighting from the lighting direction associated with the training sample; identifying a ground-truth OLAT image included in the group of OLAT images for the training sample that corresponds to the lighting direction for the training sample; calculating a loss that indicates a perceptual difference between the output predicted image and the identified ground-truth OLAT image; and updating parameters of the convolutional neural network based on the calculated loss.

In accordance with some embodiments of the disclosed subject matter, a computer-readable medium containing computer executable instructions that, when executed by a processor, cause the processor to perform a method according to any aspect or embodiment described herein is provided. In some embodiments the computer-readable medium may be a non-transitory computer-readable medium.

In accordance with some embodiments of the disclosed subject matter, a system for relighting images using deep reflectance fields is provided, the system comprising: means for identifying a group of training samples, wherein each training sample includes (i) a group of one-light-at-a-time (OLAT) images that have each been captured when one light of a plurality of lights arranged on a lighting structure has been activated, (ii) a group of spherical color gradient images that have each been captured when the plurality of lights arranged on the lighting structure have been activated to each emit a particular color, and (iii) a lighting direction, wherein each image in the group of OLAT images and each of the spherical color gradient images are an image of a subject, and wherein the lighting direction indicates a relative orientation of a light to the subject; means for training a convolutional neural network using the group of training samples; means for identifying a test sample that includes a second group of spherical color gradient images and a second lighting direction; and means for generating a relit image of the subject included in each of the second group of spherical color gradient images with lighting from the second lighting direction using the trained convolutional neural network. In some embodiments, the means for training the convolutional neural network comprises: for each training iteration in a series of training iterations and for each training sample in the group of training samples: means for generating an output predicted image, wherein the output predicted image is a representation of the subject associated with the training sample with lighting from the lighting direction associated with the training sample; means for identifying a ground-truth OLAT image included in the group of OLAT images for the training sample that corresponds to the lighting direction for the training sample; means for calculating a loss that indicates a perceptual difference between the output predicted image and the identified ground-truth OLAT image; and means for updating parameters of the convolutional neural network based on the calculated loss.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
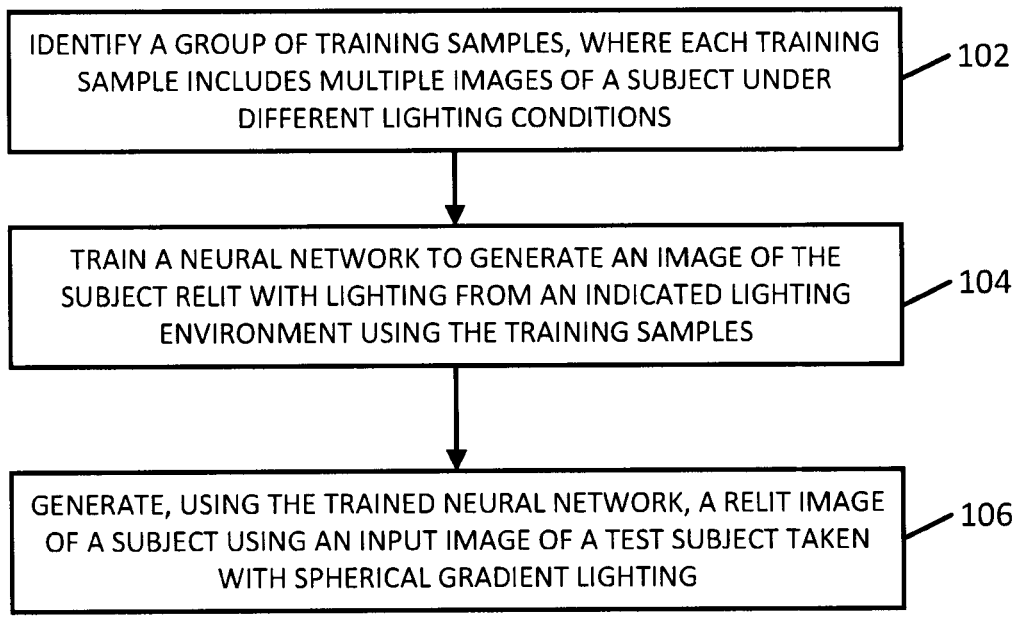
FIG. 1 shows an illustrative example of a process for relighting images using predicted deep reflectance fields in accordance with some embodiments of the disclosed subject matter.

In accordance with various embodiments, mechanisms (which can include methods, systems, and media) for relighting images using predicted deep reflectance fields are provided.

In some embodiments, the mechanisms described herein can generate a relit image of a subject using spherical color gradient images of the subject. Further details of spherical color gradient images can be found, for example, in "Cosine Lobe Based Relighting from Gradient Illumination Photographs" by G. Fyffe et al. in SIGGRAPH '09. In some embodiments, the spherical color gradient images can be captured using a group of lights (e.g., two hundred lights, three hundred lights, etc.) arranged on a lighting structure, such as a spherical dome, and each programmed to emit light of a particular color and density. In some embodiments, the mechanisms described herein can use a relatively small number (e.g., two, and/or any other suitable number) of spherical color gradient images of the subject to generate an image of the subject in a lighting environment with lighting from a specified lighting direction relative to the subject and as a result is less computationally intensive than current methods. Note that, in some embodiments, the subject can be any suitable subject, such as a portion of a human (e.g., a face, and/or any other suitable portion), an animal, a plant, and/or any other suitable subject. Additionally, note that, by using a relatively small number of spherical color gradient images of the subject as an input, the mechanisms described herein can generate the relit image of the subject without requiring the subject to sit or stay still for a long period of time since the small number of spherical color gradient images of the subject can be captured in a short time. The mechanisms described herein may therefore be used with moving or dynamic subjects, as well as with still subjects.

The mechanisms described herein can generate the relit image of the subject using the spherical color gradient images of the subject using a trained neural network that has been trained to learn a full 4D reflectance field using spherical color gradient images. In particular, the neural network can be trained using both spherical color gradient images that have been captured with a group of lights of a lighting structure all activated and using a group of one-light-at-a-time (OLAT) images that have been captured with each light of the lighting structure individually activated. The neural network can then be trained to reconstruct a particular OLAT image with light emitted from a particular lighting direction using the spherical color gradient images. For example, in some embodiments, the neural network can be trained to reconstruct an OLAT image that corresponds to a particular light located at a particular orientation relative to the subject that corresponds to a particular lighting direction (e.g., lighting emitted from a light source located at a particular spherical coordinate (r, θ, φ), and/or at any other suitable location). Note that, after training, the neural network can be used to generate the relit image of the subject using only the spherical color gradient images. That is, by learning a mapping of OLAT images to specific lighting directions during training using the spherical color gradient images and the OLAT images, the neural network can generate a relit image using only the spherical color gradient images. Note that more detailed techniques for training the neural network are shown in and described below in connection with FIGS. 3 and 6.

In some embodiments, the spherical color gradient images and the OLAT images can be captured in any suitable manner. For example, in some embodiments, the spherical color gradient images and the OLAT images can be captured using a lighting environment generated by any of a group of lights arranged on a lighting structure (e.g., a spherical dome, a lighting arm, and/or any other suitable type of lighting structure). As a more particular example, as described below in connection with FIG. 2, the spherical color gradient images can each have a lighting environment generated by activating each light of the lighting structure with a particular intensity and color. As another more particular example, as described below in connection with FIG. 2, the OLAT images can each have a lighting environment generated by activating a single light of the lighting structure. Note that, in some embodiments, each image can be captured by any suitable camera having any suitable viewpoint of the subject.

Note that, in some embodiments, each OLAT image can correspond to a particular light of the lighting structure that corresponds to a particular lighting direction being activated. In some embodiments, the relit image can be an image with a lighting environment that corresponds to a light with a lighting direction that matches one of the OLAT images. For example, in an instance where a particular OLAT image corresponds to a light source with a particular spherical coordinate (e.g., (r, 30°, 60°), and/or any other suitable spherical coordinate), the relit image can be an image of the subject lit with a light source at the same spherical coordinate. Additionally or alternatively, in some embodiments, the relit image can be an image with a lighting environment that corresponds to a light with a lighting direction that is not included in any of the OLAT images used during training of the neural network. That is, in some embodiments, the neural network can be trained such that the neural network can interpolate between lighting directions included in the OLAT images used during training. Additionally, note that, in some embodiments, images used during training of the neural network (e.g., the OLAT images and/or the spherical color gradient images) can be captured from a camera of a group of cameras that each have a particular viewpoint of the subject. For example, in some embodiments, images used during training can be captured from one of five cameras, each with a different orientation to the subject. In some embodiments, a relit image generated by the trained neural network can be generated using spherical color gradient images of the subject captured from a camera not used to capture the training images. That is, in some embodiments, the neural network can learn to generalize viewpoint during training.

Turning to FIG. 1, an illustrative example 100 of a process for relighting images using predicted deep reflectance fields is shown in accordance with some embodiments of the disclosed subject matter. In some embodiments, blocks of process 100 can be performed on any suitable device, such as a server, a desktop computer, a laptop computer, and/or any other suitable device. In some embodiments, blocks of process 100 can be performed using multiple devices.

Process 100 can begin at 102 by identifying a group of training samples. In some embodiments, each training sample can include a group of images of a subject under different lighting conditions. For example, in some embodiments, the group of images can include images of the subject captured using a group of lights of a lighting structure (e.g., lights arranged on a spherical dome, lights arranged on a lighting arm, and/or any other suitable type of lighting structure). As a more particular example, in some embodiments, the group of images can include a group of OLAT images, where each OLAT image is captured with one light of the group of lights of the lighting structure is activated. In some such embodiments, the group of OLAT images can include any suitable number of OLAT images (e.g., one hundred, two hundred, three hundred, four hundred, and/or any other suitable number). Note that, in some embodiments, the number of OLAT images in the group of OLAT images can correspond to a number of lights on the lighting structure. For example, in an instance where there are three hundred lights on the lighting structure, there can be three hundred OLAT images in the group of OLAT images. As another more particular example, in some embodiments, the group of images can include a group of spherical color gradient images. In some embodiments, the group of spherical color gradient images can include any suitable number of spherical color gradient images (e.g., two, three, four, and/or any other suitable number). In some embodiments, a spherical color gradient image can be an image of the subject captured using any of the lights of the lighting structure which can each be programmed to have any suitable color (e.g., any suitable RGB color values, and/or any other suitable color) and/or intensity.

Note that, in some embodiments, the group of images associated with a particular training sample can be captured from a camera with the same viewpoint of the subject. For example, in some embodiments, the group of OLAT images and the group of spherical color gradient images can each be captured using the camera with the same orientation to the subject. Additionally, note that, in some embodiments, groups of images corresponding to different training samples can be captured by different cameras with different viewpoints of the subject. For example, in some embodiments, a first group of images corresponding to a first training sample can be captured using a first camera that is located at a particular location relative to a subject, and a second group of images corresponding to a second training sample can be captured using a second camera that is located at a different location relative to the subject. As a more particular example, in an instance in which the lighting structure is a spherical dome, the first camera can be located directly in front of the subject, and the second camera can be located to the side of the subject. Note that, in some embodiments, any suitable number of cameras, each at any suitable position, can be used to capture images associated with training samples. Additionally, note that, a group of training samples can include images of any suitable number of subjects (e.g., five, ten, twenty, and/or any other suitable number). In some embodiments, a subject can correspond to any suitable entity, such as a human, a human face, an animal, an object (e.g., a plant, furniture, etc.), and/or any other suitable subject of an image.

Note that techniques for capturing images associated with each training sample are described below in more detail in connection with FIG. 2.

In some embodiments, process 100 can identify the group of training samples in any suitable manner. For example, in some embodiments, process 100 can access a database of images and can construct a group of training samples based on the retrieved images. Note that, in some embodiments, process 100 can construct a group of training samples and a group of validation samples using retrieved images. In some such embodiments, the group of validation samples can be similar to the group of training samples but can be set aside during training of the neural network, as described below in connection with block 104. Additionally, note that, in some embodiments, the group of training samples can include images that were all captured using the same group of cameras. In some such embodiments, the group of validation samples can be constructed to include images captured with cameras not included in the group of samples used to capture the images included in the group of training samples.

At 104, process 100 can train a neural network to generate an image of the subject relit with lighting from an indicated lighting environment using the training samples. In some embodiments, the neural network can be trained to take any suitable images of a subject as an input and generate, as an output, an image of the subject relit using an indicated lighting environment. For example, in some embodiments, process 100 can be trained to take, as an input, spherical color gradient images of a subject and an indicated lighting environment (e.g., lighting of a particular color from a particular direction, and/or any other suitable lighting environment), and produce, as an output, an image of the subject relit using the indicated lighting environment.

In some embodiments, the neural network can have any suitable type of architecture. For example, in some embodiments, the neural network can be an encoder-decoder network. As a more particular example, in some embodiments, the neural network can be a U-Net convolutional neural network that uses an encoder path (that includes any suitable number of encoder layers) to iteratively generate feature maps associated with images corresponding to each training sample, and a corresponding decoder path (with a number of decoding layers that corresponds to the number of encoding layers) that generates an output image using the feature maps generated by the encoder layers. Note that an example of such as U-Net architecture is shown in and described below in connection with FIG. 6. Additionally, note that, detailed techniques for training the neural network are shown in and described below in connection with FIG. 3.

At 106, process 100 can generate, using the trained neural network, a relit image of a subject using, as inputs, images of the subject taken using spherical gradient lighting and an indicated lighting environment. In some embodiments, the indicated lighting environment can correspond to any suitable lighting environment. For example, in some embodiments, the indicated lighting environment can include one or more lights from a particular direction relative to the subject. Note that, in some embodiments, a position of a light can be indicated in any suitable manner, for example, using spherical coordinates relative to a center of a spherical lighting dome, using spherical coordinates relative to a location of a subject, and/or in any other suitable manner. Note that, in some embodiments, each lighting direction of the one or more lights can correspond to a particular light position of a light associated with an OLAT image included in the training samples. Alternatively, in some embodiments, a lighting direction can be a direction not included in the OLAT images. For example, in an instance where the group of OLAT images included in the training samples includes a first OLAT image with a light at a spherical coordinate of (5, 30°, 65°) and a second OLAT image with a light at a spherical coordinate of (5, 35°, 65°), the neural network can generate the output image with a lighting direction that is interpolated between the two OLAT images (e.g., with a spherical coordinate of (5, 32°, 65°), and/or any other suitable interpolated coordinates). Additionally, note that, in some embodiments, the indicated lighting environment can include a superposition of multiple lights, each with an indicated lighting direction (each of which can correspond to an OLAT image in the training samples or can be a direction interpolated between OLAT images in the training samples). In some embodiments, the lighting environment can also indicate a color of each light in the one or more lights, for example, using RGB values, and/or in any other suitable manner.

Note that, in some embodiments, the generated image can be stored in any suitable manner. For example, in some embodiments, the generated image can be stored as a new image in association with information associated with the generated image, such as information indicating the lighting environment with which the subject was relit to generate the generated image. Additionally or alternatively, in some embodiments, the generated image can be presented in any suitable manner. For example, in some embodiments, the generated image can be presented in a user interface, such as a user interface presented on a user device from which generation of the relit image using the trained neural network was initiated at block 106.

Figure 2:
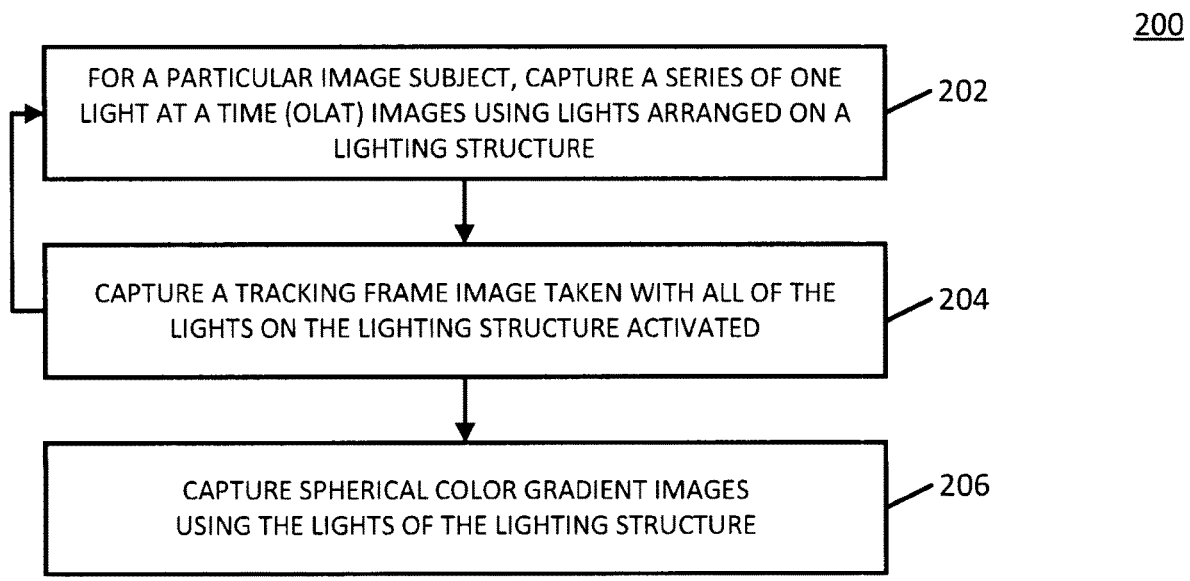
FIG. 2 shows an illustrative example of a process for generating training samples for training a network to relight images in accordance with some embodiments of the disclosed subject matter.

Turning to FIG. 2, an illustrative example 200 of a process for generating training samples for training a neural network to generate relit images is shown in accordance with some embodiments of the disclosed subject matter. In some embodiments, blocks of process 200 can be performed by any suitable device. For example, in some embodiments, blocks of process 200 can be processed by a device, such as a desktop computer or a laptop computer that controls lights of a lighting structure and/or one or more cameras suitable for capturing images from any suitable viewpoint. In some embodiments, images captured during execution of the blocks of process 200 can be stored on the device executing process 200. Additionally or alternatively, in some embodiments, images captured during execution of the blocks of process 200 can be transmitted to a different device (e.g., a server that stores a database of images, and/or any other suitable server) for storage.

Process 200 can begin at 202 by capturing a series of OLAT images of a particular image subject. In some embodiments, the OLAT images can be captured using lights arranged on any suitable lighting structure. For example, in some embodiments, the lighting structure can be a spherical dome with any suitable number (e.g., one hundred, two hundred, three hundred, four hundred, etc.) lights arranged at any suitable positions on the spherical dome. In some such embodiments, the spherical dome can have any suitable diameter (e.g., 3.5 meters, 4 meters, and/or any other suitable diameter). As another example, in some embodiments, the lighting structure can be a lighting arm that can be moved to different positions. Note that, in some embodiments, the lights can be any suitable type of lights. For example, in some embodiments, the lights can be LED lights that each be programmed to have any suitable RGB value. As another example, in some embodiments, the lights can be tungsten lights. Note that, in some embodiments, each light can be controllable by a driver, which can cause the light to emit a light of an indicated intensity and/or color.

In some embodiments, each OLAT image of the series of OLAT images can be captured when one light of the lighting structure is activated and the other lights of the lighting structure are not activated. In some embodiments, the activated light can be programmed to have any suitable color. For example, in some embodiments, the activated light can have a white color. As a more particular example, in some embodiments, the activated light can be programmed to have an RGB value of (255, 255, 255). In some embodiments, each OLAT image in the series of OLAT images can be captured with a different light activated on the lighting structure. For example, in some embodiments, the series of OLAT images can be captured by iterating through the lights of the lighting structure one at a time, where each image in the series of OLAT images corresponds to activation of a different light of the lighting structure.

In some embodiments, each OLAT image can be captured by any suitable camera. In some embodiments, a camera can have any suitable viewpoint of the subject. That is, in some embodiments, a camera can be located at any suitable orientation relative to the subject. In some embodiments, process 200 can have access to any suitable number of cameras (e.g., one, two, five, ten, and/or any other suitable number), each located with a different orientation to the subject, thereby capturing an image of the subject from a different viewpoint. In some embodiments, a camera, or each camera of a group of cameras can be any of any suitable model (e.g., a Sony IMX253 camera, and/or any other suitable model). In some embodiments, each camera can be capable of capturing images with any suitable resolution (e.g., 10 MP, 12 MP, 15 MP, and/or any other suitable resolution), and at any suitable rate (e.g., 60 Hz, and/or any other suitable rate). Note that, in some embodiments, the camera(a) and the lights of the lighting structure can be synchronized via any suitable type of hardware trigger.

At 204, process 200 can capture a tracking frame image taken with all of the lights of the lighting structure activated. In some embodiments, by activating all of the lights of the lighting structure, an image of the subject can be captured with homogeneous illumination.

In some embodiments, the tracking frame image can be used in any suitable manner to compensate for movement of the subject between successive OLAT images as described above in connection with block 202. For example, in some embodiments, the tracking frame image can be captured after a subset of the OLAT images have been captured. Then, process 200 can loop back to block 202 to capture a second subset of the OLAT images and can continue iterating through blocks 202 and 204 until all of the OLAT images have been captured. As a more particular example, in an instance in which there are 331 lights on the lighting structure, and therefore, in which 331 OLAT images are to be captured, process 200 can capture a tracking frame image after capturing 11 OLAT images, and can loop through blocks 202 and 204 after every 11 OLAT images.

In some embodiments, correspondence of the subject across all of the OLAT images can be computed using the tracking frame in any suitable manner. For example, in some embodiments, after all of the OLAT images are captured, process 200 can designate a final tracking frame (that is, the most recently captured tracking frame image) as a reference and can then compute a dense optical flow-field across the tracking frames using any suitable method or technique(s). In some embodiments, process 200 can then linearly interpolate the optical flow field through time to provide correspondence across the OLAT images. Note that, in some embodiments, correspondence across the OLAT images can be provided at any suitable time point, such as at a time point after all OLAT images have been captured, prior to beginning training of the neutral network as described below in connection with FIG. 3, and/or at any other suitable time point.

At 206, process 200 can capture spherical color gradient images using the lights of the lighting structure. In some embodiments, process 200 can capture any suitable number of spherical color gradient images (e.g., one, two, five, and/or any other suitable number). In some embodiments, process 200 can capture the spherical color gradient images using a camera at any suitable orientation relative to the subject. For example, in some embodiments, the spherical color gradient images can be captured using the same camera (and therefore, having the same viewpoint of the subject) as the camera used to capture the OLAT images at block 202 and/or the tracking frame images at block 204.

In some embodiments, the spherical color gradient images can be captured with the lights of the lighting structure programmed to have any suitable color(s). For example, in some embodiments, each light of the lighting structure can be programmed to emit a color based on a relative location of the light on the lighting structure. As a more particular example, in an instance in which two spherical color gradient images are captured, for a light with a direction vector of $\theta$ (where $\theta_x$ is the x-component of the direction vector $\theta$, where $\theta_y$ is the y-component of the direction vector $\theta$, and where $\theta_z$ is the z-component of the direction vector $\theta$), the light can be programmed to emit, for the first of the two spherical color gradient images, a light color with an RGB value of:

$$((1+\theta_x)/2, (1+\theta_y)/2, (1+\theta_z)/2),$$

and, for the second of the two spherical color gradient images, a light color with an RGB value of:

$$((1-\theta_x)/2, (1-\theta_y)/2, (1-\theta_z)/2).$$

Note that, in some embodiments, lights patterns of lights that are used for capturing the spherical color gradient images can be chosen to satisfy any suitable criteria. For example, in some embodiments, the lights can be programmed to emit colors for each of the spherical color gradient images such that, when summed, the light patterns produce a full-on white light condition which reveals the subject's total reflectance (that is, diffuse plus specular), and such that the difference of the spherical color gradient images encodes the average reflectance direction into the RGB color channels (which can be a strong cue for surface normals). Additionally, in some embodiments, the magnitude of a difference image relative to a sum image can be a function of not only the Bidirectional Reflectance Distribution Function (BRDF) but also the local self-shadowing, which can provide cues to shadow estimation. In some embodiments, the light patterns used during capture of the spherical color gradient images can provide both geometric and albedo information to the neural network.

Figure 3:
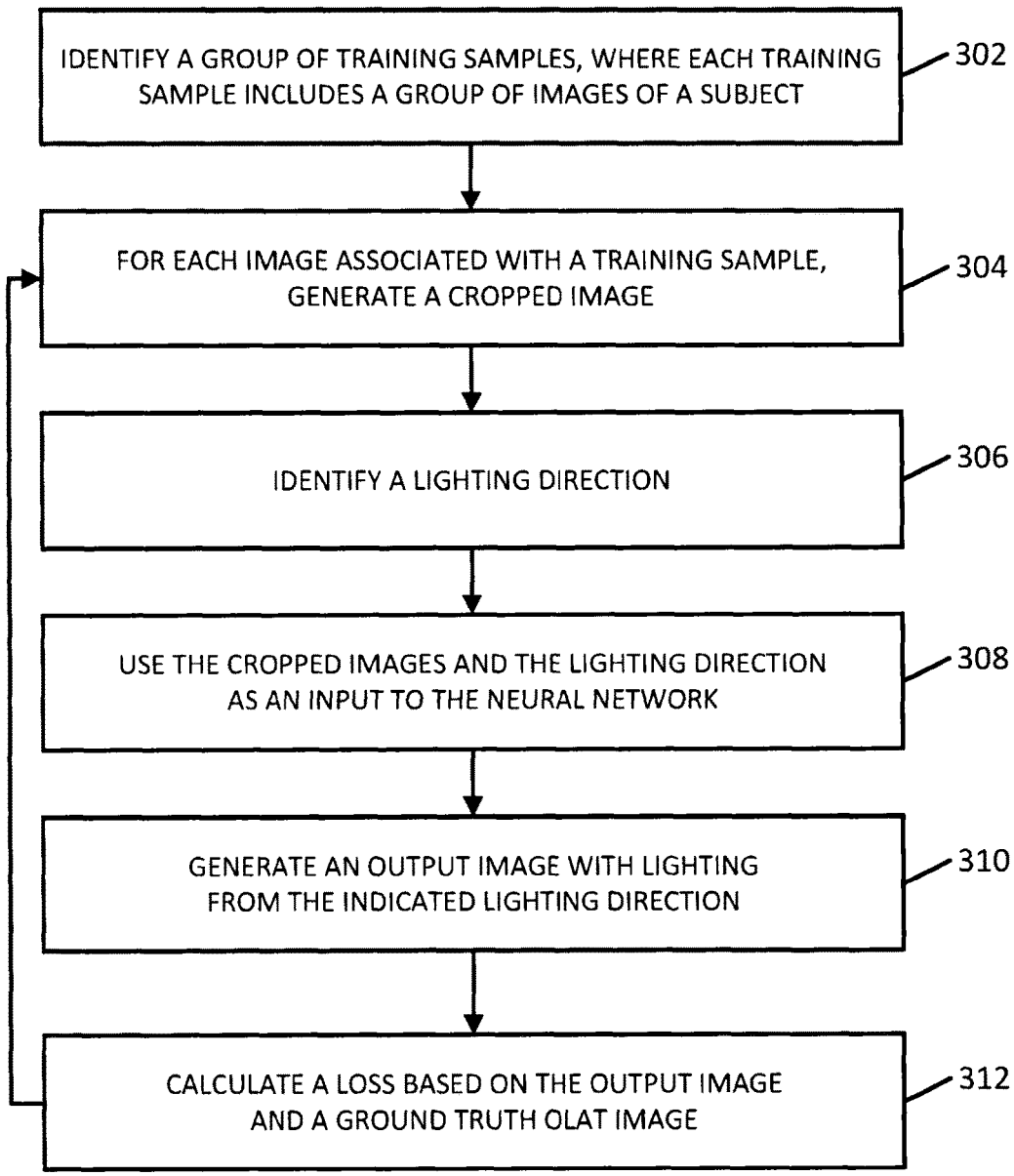
FIG. 3 shows an illustrative example of a process for training a neural network to relight images using predicted deep reflectance fields in accordance with some embodiments of the disclosed subject matter.

Turning to FIG. 3, an illustrative example 300 of a process for training a neural network to generate relit images of a subject using deep reflectance fields is shown in accordance with some embodiments of the disclosed subject matter. In some embodiments, blocks of process 300 can be executed on any suitable device or on any suitable combination of devices. For example, in some embodiments, blocks of process 300 can be executed on any suitable number (e.g., one, five, ten, twelve, and/or any other suitable number) of Graphical Processing Units (GPUs).

Process 300 can begin by identifying a group of training samples, where each training sample includes a group of images of a subject. As described above in connection with FIGS. 1 and 2, the group of images of the subject corresponding to one training sample can include any suitable images, such as a series of OLAT images captured with different lights of a lighting structure activated as described above in connection with block 202, a series of spherical color gradient images as described above in connection with block 206, and/or any other suitable images. In some embodiments, each image in the group of images corresponding to one training sample can be captured from the same camera and can therefore have the same orientation to the subject. Note that, in some embodiments, different training samples can correspond to different subjects and can be associated with images captured from different orientations with respect to the subject. In some embodiments, process 300 can identify the group of training samples in any suitable manner. For example, in some embodiments, process 300 can retrieve groups of images corresponding to each training sample from a database of images. Note that, in some embodiments, each image associated with the group of training samples can have any suitable size (e.g., 2560×3072 pixels, and/or any other suitable size).

At 302, process 300 can, for each image associated with a training sample, generate a cropped image. In some embodiments, each cropped image can have any suitable size (e.g., 512×512 pixels, and/or any other suitable size). In some embodiments, process 300 can generate the cropped image corresponding to each image associated with the training sample in any suitable manner. For example, in some embodiments, process 300 can identify a random pixel location within the images associated with the training sample and can crop each of the images associated with the training sample to the cropped image size centered on the identified random pixel location.

Note that, in some embodiments, process 300 can identify any suitable subset of the group of images associated with the training sample, and process 300 can crop images in the identified subset of the group of images. For example, in some embodiments, process 300 can crop any of the spherical color gradient images (e.g., all of the spherical color gradient images, and/or any suitable subset of the spherical color gradient images). As another example, in some embodiments, process 300 can identify any suitable subset of the OLAT images, and process 300 can crop the OLAT images in the identified suitable subset of the OLAT images. In some such embodiments, the subset of the OLAT images can be identified in any suitable manner. For example, in some embodiments, the subset of the OLAT images can be selected at random. In some embodiments, the subset of the OLAT images can include any suitable number of OLAT images (e.g., five, ten, twenty, and/or any other suitable number). In some embodiments, the number of OLAT images in the subset of the OLAT images can be based on a number of GPUs on which process 300 is executed. For example, in an instance in which 12 GPUs are used to execute process 300, process 300 can select 12 OLAT images from the group of OLAT images.

At 306, process 300 can identify a lighting direction. In some embodiments, the lighting direction can be identified in any suitable manner. For example, in some embodiments, process 300 can identify a random lighting direction. As a more particular example, in some embodiments, process 300 can identify a random lighting direction corresponding to a location on a sphere that is associated with any suitable spherical coordinates. Note that, in some embodiments, the lighting direction can additionally indicate a distance of the light source from the subject. That is, in some embodiments, the lighting direction can be indicated in spherical coordinates as $(r, \theta, \varphi)$, where r indicates a distance of a light from a subject, and $\theta$ and $\varphi$ indicate a relative orientation of the light from the subject in angular coordinates. Additionally, note that, in some embodiments, the lighting direction can be a direction and/or a distance that corresponds to a light source associated with one of the OLAT images. Furthermore, in an instance in which a subset of the OLAT images was identified at 304, the lighting direction can correspond to a direction and/or a distance of a light source associated with an OLAT image in the subset of the OLAT images.

At 308, process 300 can use the cropped images generated at block 304 and the lighting direction identified at block 306 as inputs to a neural network.

Note that, in some embodiments, the neural network can have any suitable architecture. For example, in some embodiments, the neural network can be a convolutional neural network (CNN). As a more particular example, in some embodiments, the neural network can be a U-Net convolutional neural network. In some embodiments, a U-Net architecture can have an encoder path that includes a series of encoder layers, and a decoder path with a series of decoder layers that is connected to the encoder path. In some such embodiments, the U-Net architecture can use the encoder path to iteratively generate a series of feature maps corresponding to an input image. The U-Net architecture can then use the decoder path to reconstruct the input image with a different lighting direction (e.g., the lighting direction identified at block 306) using the series of decoder layers. Note that more detailed techniques for using a U-Net architecture are shown in and described below in connection with FIG. 6.

At 310, process 300 can generate an output image corresponding to a region of the image included in the cropped images with lighting from the indicated lighting direction. For example, in an instance in which each of the cropped images shows a particular portion of a face of a subject (e.g., a mouth of the subject, a nose of the subject, a shoulder of the subject, etc.), the output image can correspond to the same portion of the face of the subject, and can be lit with lighting corresponding to the lighting direction indicated in the input, as described above in connection with block 308.

In some embodiments, process 300 can generate the output image in any suitable manner and using any suitable technique(s). For example, in an instance in which the neural network is a U-Net convolutional neural network, process 300 can use encoder layers of the U-Net convolutional neural network to iteratively generate successive feature maps corresponding to the input images. In some embodiments, after iterating through all of the encoder layers of the U-Net convolutional neural network, process 300 can traverse a series of decoder layers of the U-Net convolutional neural network using the feature maps generated by the encoders of the U-Net convolutional neural network. In some embodiments, the final decoder of the U-Net convolutional neural network can generate an output image that is a recreation of the input images that is lit from the indicated lighting direction.

Figure 6:
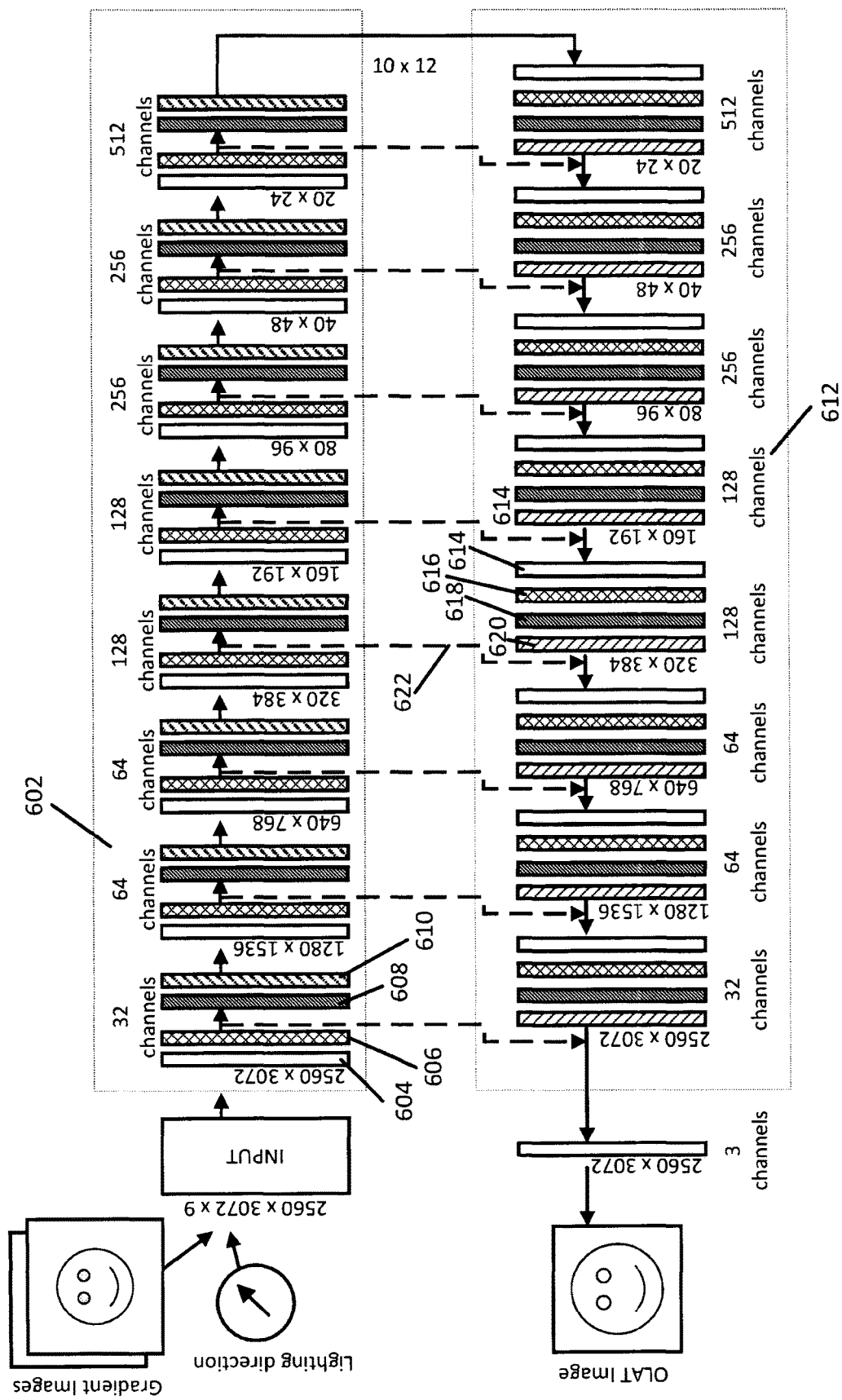
FIG. 6 shows a schematic diagram of an illustrative architecture of a neural network that can be trained to relight images using predicted deep reflectance fields in accordance with some embodiments of the disclosed subject matter.

Turning to FIG. 6, an illustrative example 600 of a U-Net architecture that can be used to generate relit images using deep reflectance fields is shown in accordance with some embodiments of the disclosed subject matter. Note that architecture 600 shows an illustrative example of an architecture that can be used at inference time, that is, after the neural network shown in architecture 600 has been trained to generate an output image for an input test image. However, the same architecture can be used to train the neural network, as described below. Note that the image sizes shown in FIG. 6 can correspond to a size of images used during inference time (e.g., after the network has been trained), that is, images that are uncropped. Although architecture 600 can be used during training of the neural network, in some embodiments, training images can be of a smaller size (that is, of the cropped size, as described above in connection with block 304 of FIG. 3).

Architecture 600 can receive a series of images and a lighting direction as an input, as shown in FIG. 6. For example, the input can include a group of spherical color gradient images and a group of OLAT images, as described above in connection with blocks 302 and 304 of FIG. 3. Note that, in some embodiments, each image can be of any suitable size, W×H. Additionally, note that, in some embodiments, the lighting direction can be appended to each pixel of the spherical color gradient images as RGB values. Therefore, in an instance in which two spherical color gradient images are used (as described above in connection with block 206 of FIG. 2), the two spherical color gradient images can be combined with the lighting direction to generate a tensor of size W×H×9. That is, each pixel of each spherical color gradient can be associated with RGB values for that pixel, such that the two spherical color gradient images each have a size of W×H×3, and the lighting direction can be appended to each pixel of the spherical color gradient images, where the lighting direction itself is specified as an RGB channel value for each pixel. Note that, for a test image when using the trained neural network at inference time, the images can each be of a first width and height (e.g., 2560×3072 pixels, as shown in FIG. 6). However, during training of the neural network, each image can be a cropped image of a different, smaller size (e.g., 512×512 pixels, and/or any other suitable cropped size). Additionally, note that the input as shown in FIG. 6 only shows the lighting direction and the spherical color gradient images, as those are the inputs used by the trained neural network at inference time. During training of the neural network, the network can additionally take as input the OLAT images or the identified subset of the OLAT images, as described above in connection with block 202 of FIG. 2 and blocks 302 and 304 of FIG. 3.

As shown in FIG. 6, architecture 600 can have an encoder path 602. In some embodiments, encoder path 602 can include a series of encoder layers. For example, architecture 600 shows eight encoder layers in encoder path 602. In some embodiments, each encoder layer can take an image as an input and can generate a feature map of the image. In some embodiments, the generated feature map can then become the input image fed to the next encoder layer. In some embodiments, each generated feature map of the input image can have a smaller width and height relative to the input to the encoder layer, but a larger number of channels (e.g., a larger depth) relative to the input to the encoder layer. For example, as shown in FIG. 6, the first encoder layer can take an input image of size 2560×3072 and can generate a feature map of size 1280×1536.

As shown in FIG. 6, architecture 600 can have a decoder path 612. In some embodiments, decoder path 612 can include a series of decoder layers. In some embodiments, a number of decoder layers included in decoder path 612 can be the same as a number of encoder layers included in encoder path 602. For example, as shown in FIG. 6, there are eight decoder layers included in decoder path 612. In some embodiments, each decoder layer can receive, as an input, a feature map, and generate an output image that is larger in size than the size of the input feature map. For example, as shown in FIG. 6, a decoder layer can receive, as an input, a feature map of size 1280×1536 and can generate, as an output, an image of size 2560×3072.

Note that, in some embodiments, by passing the group of input images through the series of encoder layers, the neural network can learn features represented in the images, and by passing the feature maps through the series of decoder layers, the neural network can learn to reconstruct the images using the feature maps, but having the lighting direction indicated in the input.

In some embodiments, each encoder layer in encoder path 602 can have a convolution block 604, a rectifier block 606, a normalization block 608, and a max pooling block 610.

In some embodiments, convolution block 604 can include an application of any suitable convolution kernel of any suitable size (e.g., 3×3, and/or any other suitable size) to the image at the input of the encoder layer. Note that, in some embodiments, the convolution kernel applied at each convolution block can be changed during training of the neural network as a loss function is optimized, as described below in connection with block 312.

In some embodiments, rectifier block 606 can include application of any suitable rectifier function or activation function to the output of convolution block 604. In some embodiments, any suitable type of rectifier or activation function can be used, such as a softplus rectifier, a half-wave rectifier, a logistic rectifier, a hyperbolic tangent activation function, a Rectified Linear Unit (ReLU) activation function, a leaky ReLU activation function, and/or any other suitable type of rectifier or activation function.

In some embodiments, normalization block 608 can perform any suitable normalization on the output of rectifier block 606. For example, in some embodiments, normalization block 608 can normalize pixel values to within any suitable range. In some embodiments, the normalization can be a batch normalization across all images associated with the training sample.

In some embodiments, max pooling block 610 can pool values within the image at the output of normalization block 608 to down-sample the image. In some embodiments, max pooling can be performed in any suitable manner and using a block of any suitable size. For example, in some embodiments, a 2×2 kernel can be applied to blocks of the image, where the maximum value in each 2×2 block is selected as the output value, thereby down-sampling the image and selecting relatively important features to remain in the output feature map.

In some embodiments, a decoder layer of decoder path 612 can include a convolution block 614, a rectifier block 616, a normalization block 618, and an upsampling block 620. In some embodiments, convolution block 614, rectifier block 616, and normalization block 618 can be similar to convolution block 604, rectifier block 606, and normalization block 610, respectively.

In some embodiments, upsampling block 620 can take a feature map as an input and can generate an image of a larger size relative to a size of the input feature map. For example, as shown in FIG. 6, upsampling block 620 can take as an input a feature map of size 160×192 and can generate, as an output, an image of size 320×384. In some embodiments, upsampling block 620 can perform upsampling in any suitable manner and using any suitable upsampling technique. For example, in some embodiments, upsampling block 620 can use bilinear upsampling. In some embodiments, any other suitable upsampling technique can be used, such as transposed convolution (e.g., using a 2×2 convolution kernel, and/or any other suitable convolution kernel), unpooling, interpolation (e.g., bi-linear interpolation, cubic interpolation, nearest neighbor interpolation, and/or any other suitable interpolation), and/or any other suitable upsampling technique.

Note that, as shown in FIG. 6, an output of upsampling block 620 can be concatenated with a feature map from an encoder layer of the same depth using a skip connection 622. In some embodiments, by propagating the feature map from the encoder layer to the decoder layer of a corresponding depth, the decoder layer is able to use the feature map generated by the encoder layer at the corresponding depth.

Referring back to FIG. 3, at 312, process 300 can calculate a loss based on the output image, referred to herein as $I_{pred}$, generated at block 310 and a ground truth OLAT image. In some embodiments, process 300 can identify the ground truth OLAT image, referred to hereinafter as $I_{GT}$, by identifying the OLAT image included in the group of images corresponding to the training sample that was taken with light from a direction that corresponds to the lighting direction identified at block 306. For example, if the current run of the neural network was with a lighting direction identified at block 306 of a light associated with spherical coordinates of (3.5, 30°, 60°), process 300 can identify the OLAT image with the same lighting direction.

In some embodiments, process 300 can calculate a loss that indicates a difference between $I_{pred}$ and $I_{GT}$ in feature space (that is, rather than calculating a pixel-by-pixel difference). For example, the loss can be defined as:

$$L = \|Perc(I_{pred}) - Perc(I_{GT})\|_2^2,$$

where Perc( ) indicates perceptual feature space.

In some embodiments, the loss function L can be further separated into two loss components, $L_{pre-trained}$ and $L_{specific}$. In some embodiments, the two loss components can be combined as:

$$L = L_{pre-trained} + \lambda L_{specific},$$

where $\lambda$ can be a weight of any suitable value (e.g., 0.5, and/or any other suitable value). In some embodiments, $L_{pre-trained}$ and $L_{specific}$ can indicate a loss, or a difference between $I_{pred}$ and $I_{GT}$, based on different image details. For example, in some embodiments, $L_{pre-trained}$ can indicate a loss based on a first type of characteristics or information associated with the images, such as texture information, and/or any other suitable type of image characteristics or information. As another example, in some embodiments, $L_{specific}$ can indicate a loss based on a second type of characteristics or information associated with the images, such as specularities, and/or any other suitable type of image characteristics or information. Note that, in some embodiments, $L_{pre-trained}$ can indicate a loss based on relatively lower frequency details relative to a loss represented by $L_{specific}$.

In some embodiments, each of $L_{pre-trained}$ and $L_{specific}$ can be determined using a trained convolutional neural network (e.g., a VGG network, and/or any other suitable network), referred to herein as a loss network. In some embodiments, a loss (e.g., $L_{pre-trained}$ or $L_{specific}$) can be calculated using activation layers of the trained loss network. For example, in some embodiments, a loss network can be trained using any suitable training images. After training the loss network, a loss for a particular $I_{pred}$ can be calculated by calculating an $L_2$-norm of the difference in feature space between $I_{pred}$ and $I_{GT}$ at different activation layers of each trained loss network. Note that, in some embodiments, each of $I_{pred}$ and $I_{GT}$ can be OLAT images, as described above. In some embodiments, any suitable number of activation layers can be used for each trained loss network (e.g., five, and/or any other suitable number) and can be combined in any suitable manner (e.g., a weighted sum, and/or in any other suitable manner). Additionally, note that, in some embodiments, activations can be rescaled in any suitable manner (e.g., by a feature length, and/or in any other suitable manner) to ensure that each activation layer contributes in the same manner to the final loss.

In some embodiments, the loss network for computing $L_{pre-trained}$ can be pre-trained using any suitable database of images (e.g., ImageNet, and/or any other suitable database of images) to compute a perceptual loss between $I_{pred}$ and $I_{GT}$. In some embodiments, the loss network for computing $L_{pre-trained}$ can use a VGG architecture and/or any other suitable convolutional neural network architecture with any suitable number of convolutional layers.

In some embodiments, the loss network for computing $L_{specific}$ can have any suitable architecture, such as a VGG architecture, and/or any other suitable convolutional neural network architecture with any suitable number of convolutional layers. In some embodiments, the loss network for computing $L_{specific}$ can be trained using a task that may be useful for regressing high frequency details, such as specularities. For example, in some embodiments, the loss network for computing $L_{specific}$ can be trained by using, as an input, a randomly selected patch from a ground truth OLAT image $I_{GT}$, where the model is trained to determine which light direction generated the input patch. In some embodiments, the loss network can be trained to minimize an $L_2$ loss or an $L_1$ loss. Note that, in some embodiments, minimizing an $L_1$ loss can produce sharper results for image-to-image translation tasks.

Note that, in some embodiments, $I_{GT}$ and $I_{pred}$ can be aligned in any suitable manner to prevent slight pixel misalignments between the two images from causing complications of the loss calculations. In some embodiments, any suitable alignment technique can be used to align $I_{GT}$ and $I_{pred}$. For example, in some embodiments, offsets in x and y directions, referred to herein as x' and y', can be calculated as:

$$x', y' = \mathrm{argmin}_{x,y} \Sigma_u \Sigma_v \|I_{gt}(u-x, v-y) - I_{pred}(u,v)\|_1$$

In some embodiments, I(u,v) can indicate an intensity value for a certain pixel location (u, v). In some embodiments, the offsets x and y can be sampled in any suitable window (e.g., a [−20, 20]x[−20, 20] window, and/or any other suitable window). In some embodiments, the offsets x' and y' can be used to generate an aligned ground-truth image, $\widehat{I_{GT}}$. In some embodiments, the aligned ground-truth image can then be used to calculate a loss (e.g., $L_{specific}$ and/or $L_{pretrained}$), as described above.

Referring back to FIG. 3, process 300 can update any suitable weights or parameters based on the calculated loss to minimize the loss function, and can loop back to block 304 and can generate cropped images for a new training sample.

Note that process 300 can optimize the loss function using any suitable technique or combination of techniques. For example, in some embodiments, process 300 can use any suitable optimizer (e.g., ADAM, and/or any other suitable optimizer). As another example, in some embodiments, process 300 can use any suitable learning rate (e.g., 1e-4, and/or any other suitable learning rate). In some embodiments, process 300 can use an exponential decay of the learning rate with any suitable decay (e.g., 0.1, and/or any other suitable decay) over any suitable number of iterations (e.g., 1e6 iterations, and/or any other suitable number). In some embodiments, the neural network can be optimized to execute any suitable number of iterations before the training converges.

Figure 4:
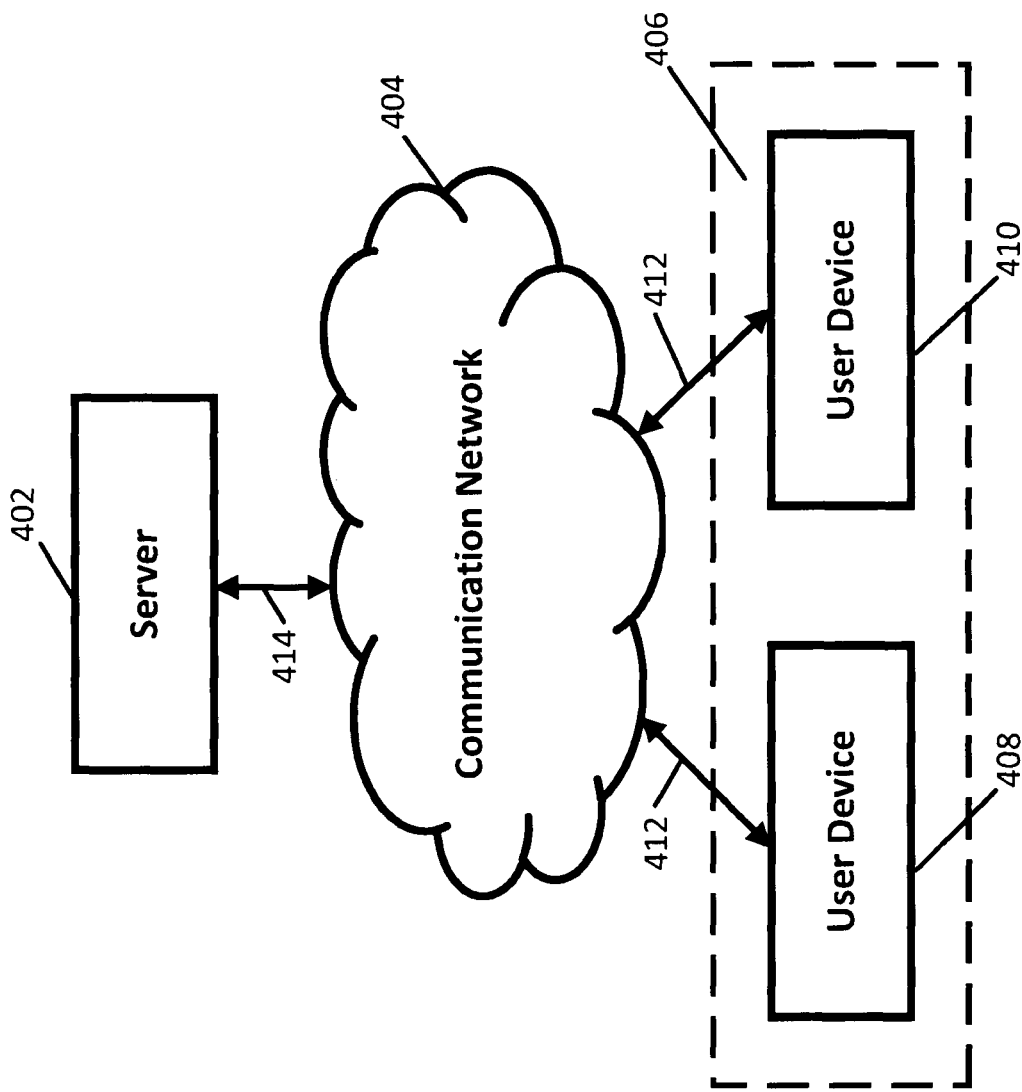
FIG. 4 shows a schematic diagram of an illustrative system suitable for implementation of mechanisms described herein for relighting images using predicted deep reflectance fields in accordance with some embodiments of the disclosed subject matter.

Turning to FIG. 4, an illustrative example 400 of hardware for relighting images using predicted deep reflectance fields that can be used in accordance with some embodiments of the disclosed subject matter is shown. As illustrated, hardware 400 can include a server 402, a communication network 404, and/or one or more user devices 406, such as user devices 408 and 410.

Server 402 can be any suitable server(s) for storing information, data, programs, and/or any other suitable type of content. In some embodiments, server 402 can perform any suitable function(s). For example, in some embodiments, server 402 can be used to train a neural network to relight images using predicted deep reflectance fields, as described above in connection with FIGS. 1 and 3. As another example, in some embodiments, server 402 can be used to generate any suitable training samples to be used by the neural network, as described above in connection with FIG. 2. Note that, in some embodiments, server 402 can store images that are used to train a neural network on a different device. In some such embodiments, server 402 can transmit images that are used to train the neural network to the device in any suitable manner.

Communication network 404 can be any suitable combination of one or more wired and/or wireless networks in some embodiments. For example, communication network 404 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

User devices 406 can include any one or more user devices suitable for training a neural network to relight images, for generating a relit image using a trained neural network, transmitting instructions to a server (e.g., server 402 described above) for training the neural network using the server, and/or transmitting instructions to a server to generate a relit image using a trained neural network. For example, in some embodiments, user devices 406 can execute any of the blocks of processes 100, 200, and 300 as shown in and described above in connection with FIGS. 1-3. As another example, in some embodiments, user devices 406 can transmit instructions to server 402 to perform any of the functions described above in connection with FIGS. 1 and 3. In some embodiments, user devices 406 can include any suitable types of devices. For example, in some embodiments, user devices 406 can include a desktop computer, a laptop computer, a mobile phone, a tablet computer, and/or any other suitable type of user device.

Although server 402 is illustrated as one device, the functions performed by server 402 can be performed using any suitable number of devices in some embodiments. For example, in some embodiments, multiple devices can be used to implement the functions performed by server 402.

Although two user devices 408 and 410 are shown in FIG. 4 to avoid over-complicating the figure, any suitable number of user devices, and/or any suitable types of user devices, can be used in some embodiments.

Figure 5:
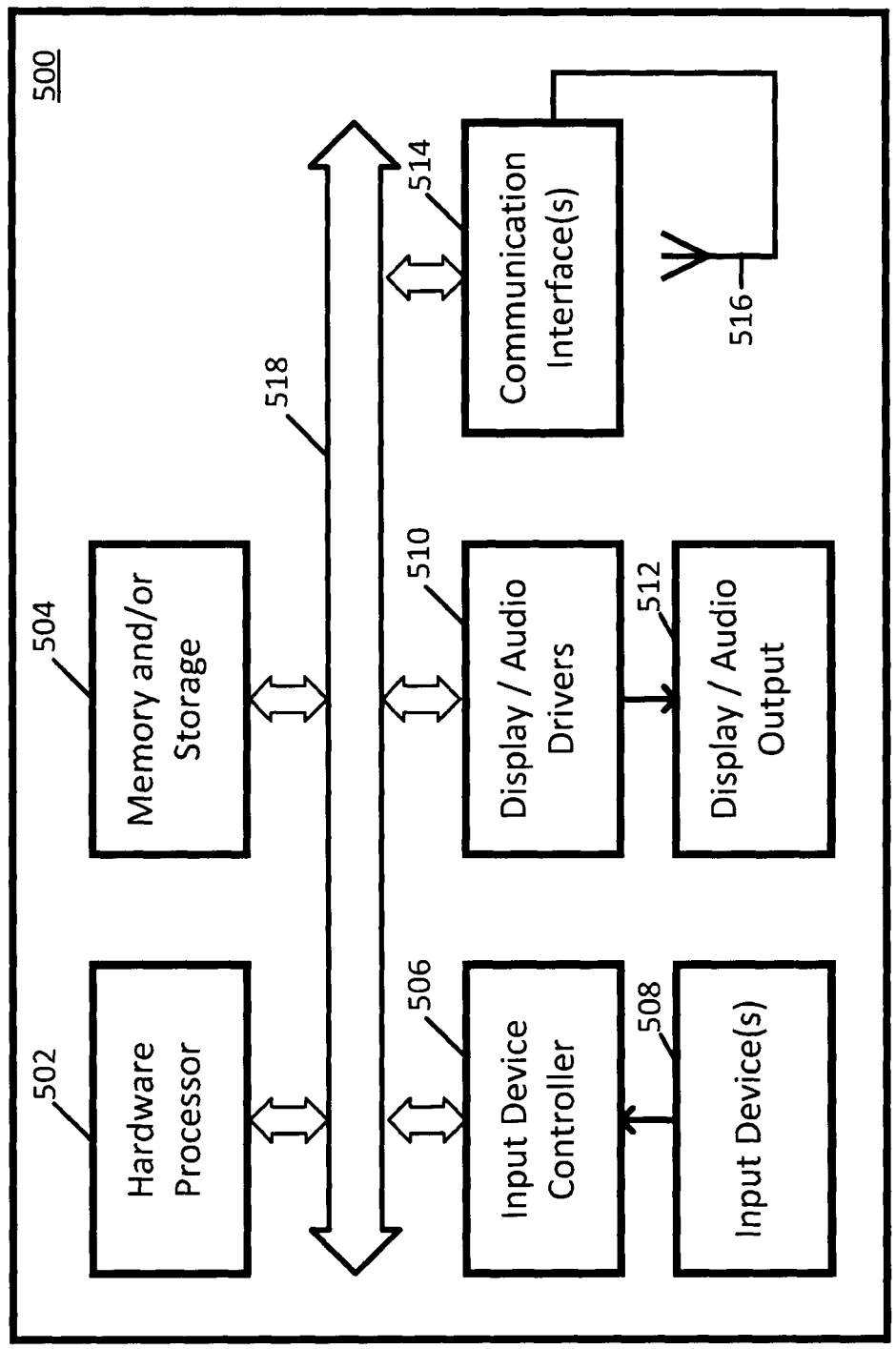
FIG. 5 shows a detailed example of hardware that can be used in a server and/or a user device of FIG. 4 in accordance with some embodiments of the disclosed subject matter.

Server 402 and user devices 406 can be implemented using any suitable hardware in some embodiments. For example, in some embodiments, devices 402 and 406 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Hardware processor 502 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 502 can be controlled by a server program stored in memory and/or storage of a server, such as server 402. In some embodiments, hardware processor 502 can be controlled by a computer program stored in memory and/or storage 504 of user device 406.

Memory and/or storage 504 can be any suitable memory and/or storage for storing programs, data, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks (e.g., computer network 404). For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some embodiments. In some embodiments, antenna 516 can be omitted.

Bus 518 can be any suitable mechanism for communicating between two or more components 502, 504, 506, 510, and 514 in some embodiments.

Any other suitable components can be included in hardware 500 in accordance with some embodiments.

In some embodiments, at least some of the above described blocks of the processes of FIGS. 1-3 can be executed or performed in any order or sequence not limited to the order and sequence shown in and described in connection with the figures. Also, some of the above blocks of FIGS. 1-3 can be executed or performed substantially simultaneously where appropriate or in parallel to reduce latency and processing times. Additionally or alternatively, some of the above described blocks of the processes of FIGS. 1-3 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for relighting images using predicted deep reflectance fields are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for relighting images using deep reflectance fields, comprising:
    identifying a group of training samples, wherein each training sample includes (i) a group of one-light-at-a-time (OLAT) images that have each been captured when one light of a plurality of lights arranged on a lighting structure has been activated, (ii) a group of spherical color gradient images that have each been captured when the plurality of lights arranged on the lighting structure have been activated to each emit a particular color, and (iii) a lighting direction, wherein each image in the group of OLAT images and each of the spherical color gradient images are an image of a subject, and wherein the lighting direction indicates a relative orientation of a light to the subject;
    training a convolutional neural network using the group of training samples, wherein training the convolutional neural network comprises:
        for each training iteration in a series of training iterations and for each training sample in the group of training samples:
            generating an output predicted image, wherein the output predicted image is a representation of the subject associated with the training sample with lighting from the lighting direction associated with the training sample;
            identifying a ground-truth OLAT image included in the group of OLAT images for the training sample that corresponds to the lighting direction for the training sample;
            calculating a loss that indicates a perceptual difference between the output predicted image and the identified ground-truth OLAT image; and
            updating parameters of the convolutional neural network based on the calculated loss;
    identifying a test sample that includes a second group of spherical color gradient images and a second lighting direction; and
    generating a relit image of the subject included in each of the second group of spherical color gradient images with lighting from the second lighting direction using the trained convolutional neural network.

2. The method of claim 1, wherein the lighting structure is a spherical dome, and wherein the plurality of lights are arranged on a surface of the spherical dome.

3. The method of claim 1, wherein the loss is calculated using a pre-trained neural network.

4. The method of claim 1, wherein the loss includes a first loss component that indicates the perceptual difference between the output image and the identified OLAT image based on texture information in each image, and wherein the loss includes a second loss component that indicates the perceptual difference between the output image and the identified OLAT image based on specularity information in each image.

5. The method of claim 4, wherein the second loss component is calculated using a trained neural network that has been trained to take, as an input, an OLAT image, and to generate, as an output, a light direction of a light used to generate the OLAT image.

6. The method of claim 1, wherein the group of OLAT images and the group of spherical color gradient images for each of the training samples are captured from a first plurality of cameras, each having a viewpoint from a first plurality of viewpoints, and wherein the second group of spherical color gradient images corresponding to the test sample are captured from a camera having a viewpoint that is not included in the first plurality of viewpoints.

7. The method of claim 1, further comprising generating an aligned ground-truth OLAT image prior to calculating the loss, wherein the loss is calculated using the aligned ground-truth image.

8. A system for relighting images using deep reflectance fields, the system comprising:
    a memory; and
    a hardware processor that, when executing computer-executable instructions stored in the memory, is configured to:
        identify a group of training samples, wherein each training sample includes (i) a group of one-light-at-a-time (OLAT) images that have each been captured when one light of a plurality of lights arranged on a lighting structure has been activated, (ii) a group of spherical color gradient images that have each been captured when the plurality of lights arranged on the lighting structure have been activated to each emit a particular color, and (iii) a lighting direction, wherein each image in the group of OLAT images and each of the spherical color gradient images are an image of a subject, and wherein the lighting direction indicates a relative orientation of a light to the subject;
        train a convolutional neural network using the group of training samples, wherein training the convolutional neural network comprises:

for each training iteration in a series of training iterations and for each training sample in the group of training samples:

generating an output predicted image, wherein the output predicted image is a representation of the subject associated with the training sample with lighting from the lighting direction associated with the training sample;

identifying a ground-truth OLAT image included in the group of OLAT images for the training sample that corresponds to the lighting direction for the training sample;

calculating a loss that indicates a perceptual difference between the output predicted image and the identified ground-truth OLAT image; and updating parameters of the convolutional neural network based on the calculated loss;

identify a test sample that includes a second group of spherical color gradient images and a second lighting direction; and generate a relit image of the subject included in each of the second group of spherical color gradient images with lighting from the second lighting direction using the trained convolutional neural network.

9. The system of claim 8, wherein the lighting structure is a spherical dome, and wherein the plurality of lights are arranged on a surface of the spherical dome.

10. The system of claim 8, wherein the loss is calculated using a pre-trained neural network.

11. The system of claim 8, wherein the loss includes a first loss component that indicates the perceptual difference between the output image and the identified OLAT image based on texture information in each image, and wherein the loss includes a second loss component that indicates the perceptual difference between the output image and the identified OLAT image based on specularity information in each image.

12. The system of claim 11, wherein the second loss component is calculated using a trained neural network that has been trained to take, as an input, an OLAT image, and to generate, as an output, a light direction of a light used to generate the OLAT image.

13. The system of claim 8, wherein the group of OLAT images and the group of spherical color gradient images for each of the training samples are captured from a first plurality of cameras, each having a viewpoint from a first plurality of viewpoints, and wherein the second group of spherical color gradient images corresponding to the test sample are captured from a camera having a viewpoint that is not included in the first plurality of viewpoints.

14. The system of claim 8, wherein the hardware processor is further configured to generate an aligned ground-truth OLAT image prior to calculating the loss, wherein the loss is calculated using the aligned ground-truth image.

15. A non-transitory computer-readable medium containing computer executable instructions that, when executed by a processor, cause the processor to perform a method for relighting images using deep reflectance fields, the method comprising:

identifying a group of training samples, wherein each training sample includes (i) a group of one-light-at-a-time (OLAT) images that have each been captured when one light of a plurality of lights arranged on a lighting structure has been activated, (ii) a group of spherical color gradient images that have each been captured when the plurality of lights arranged on the lighting structure have been activated to each emit a particular color, and (iii) a lighting direction, wherein each image in the group of OLAT images and each of the spherical color gradient images are an image of a subject, and wherein the lighting direction indicates a relative orientation of a light to the subject;

training a convolutional neural network using the group of training samples, wherein training the convolutional neural network comprises:

for each training iteration in a series of training iterations and for each training sample in the group of training samples:

generating an output predicted image, wherein the output predicted image is a representation of the subject associated with the training sample with lighting from the lighting direction associated with the training sample;

identifying a ground-truth OLAT image included in the group of OLAT images for the training sample that corresponds to the lighting direction for the training sample;

calculating a loss that indicates a perceptual difference between the output predicted image and the identified ground-truth OLAT image; and updating parameters of the convolutional neural network based on the calculated loss;

identifying a test sample that includes a second group of spherical color gradient images and a second lighting direction; and generating a relit image of the subject included in each of the second group of spherical color gradient images with lighting from the second lighting direction using the trained convolutional neural network.

16. The non-transitory computer-readable medium of claim 15, wherein the lighting structure is a spherical dome, and wherein the plurality of lights are arranged on a surface of the spherical dome.

17. The non-transitory computer-readable medium of claim 15, wherein the loss is calculated using a pre-trained neural network.

18. The non-transitory computer-readable medium of claim 15, wherein the loss includes a first loss component that indicates the perceptual difference between the output image and the identified OLAT image based on texture information in each image, and wherein the loss includes a second loss component that indicates the perceptual difference between the output image and the identified OLAT image based on specularity information in each image.

19. The non-transitory computer-readable medium of claim 18, wherein the second loss component is calculated using a trained neural network that has been trained to take, as an input, an OLAT image, and to generate, as an output, a light direction of a light used to generate the OLAT image.

20. The non-transitory computer-readable medium of claim 15, wherein the group of OLAT images and the group of spherical color gradient images for each of the training samples are captured from a first plurality of cameras, each having a viewpoint from a first plurality of viewpoints, and wherein the second group of spherical color gradient images corresponding to the test sample are captured from a camera having a viewpoint that is not included in the first plurality of viewpoints.

21. The non-transitory computer-readable medium of claim 15, wherein the method further comprises generating an aligned ground-truth OLAT image prior to calculating the loss, wherein the loss is calculated using the aligned ground-truth image.

22. A method for relighting images using deep reflectance fields, comprising:
identifying a test sample that includes at least first and second spherical color gradient images of a subject and a first lighting direction; and
generating a relit image of the subject included in each of the spherical color gradient images with lighting from the first lighting direction by using a convolutional neural network that was trained by:
identifying a group of training samples, wherein each training sample includes (i) a group of one-light-at-a-time (OLAT) images that have each been captured when one light of a plurality of lights arranged on a lighting structure has been activated, (ii) a group of spherical color gradient images that have each been captured when the plurality of lights arranged on the lighting structure have been activated to each emit a particular color, and (iii) a lighting direction, wherein each image in the group of OLAT images and each of the spherical color gradient images are an image of a subject, and wherein the lighting direction indicates a relative orientation of a light to the subject; and
training the convolutional neural network using the group of training samples, wherein training the convolutional neural network comprises:
for each training iteration in a series of training iterations and for each training sample in the group of training samples:
generating an output predicted image, wherein the output predicted image is a representation of the subject associated with the training sample with lighting from the lighting direction associated with the training sample;
identifying a ground-truth OLAT image included in the group of OLAT images for the training sample that corresponds to the lighting direction for the training sample;
calculating a loss that indicates a perceptual difference between the output predicted image and the identified ground-truth OLAT image; and
updating parameters of the convolutional neural network based on the calculated loss.

23. The method of claim 22, wherein the first spherical color gradient image of the subject has a light color with an RGB value of $((1+\theta_x)/2, (1+\theta_y)/2, (1+\theta_z)/2)$, wherein the second spherical color gradient image has a light color with an RGB value of: $((1-\theta_x)/2, (1-\theta_y)/2, (1-\theta_z)/2)$, and wherein $\theta$ is a direction vector of the light.

* * * * *

UNITED STATES PATENT AND TRADEMARK OFFICE
CERTIFICATE OF CORRECTION

| | | |
|---|---|---|
| PATENT NO. | : 10,997,457 B2 | Page 1 of 1 |
| APPLICATION NO. | : 16/616235 | |
| DATED | : May 4, 2021 | |
| INVENTOR(S) | : Rhemann et al. | |

It is certified that error appears in the above-identified patent and that said Letters Patent is hereby corrected as shown below:

On the Title Page

On Page 2, Column 1, Item (56), under "OTHER PUBLICATIONS", Line 17, delete "2017" and insert -- 2017, --, therefor.

In the Claims

In Column 21, Claim 1, Line 52, delete "subject;" and insert -- subject; and --, therefor.

In Column 22, Claim 8, Line 64, delete "subject;" and insert -- subject; and --, therefor.

In Column 24, Claim 15, Line 5, delete "subject;" and insert -- subject; and --, therefor.

Signed and Sealed this
Twentieth Day of July, 2021

Drew Hirshfeld
*Performing the Functions and Duties of the
Under Secretary of Commerce for Intellectual Property and
Director of the United States Patent and Trademark Office*